United States Patent ……… (10) Patent No.: US 8,781,018 B2
Onggosanusi et al. …………………… (45) Date of Patent: Jul. 15, 2014

(54) SIX TRANSMIT ANTENNA CODEBOOK DESIGN

(75) Inventors: Eko Onggosanusi, Allen, TX (US); Runhua Chen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/455,786

(22) Filed: Apr. 25, 2012

(65) Prior Publication Data

US 2012/0269290 A1 Oct. 25, 2012

Related U.S. Application Data

(60) Provisional application No. 61/478,599, filed on Apr. 25, 2011.

(51) Int. Cl.
*H04B 7/02* (2006.01)
*H04L 1/02* (2006.01)

(52) U.S. Cl.
USPC ............................ 375/267; 375/296

(58) Field of Classification Search
USPC .................. 375/267, 296, 260, 259, 295
See application file for complete search history.

(56) References Cited

U.S. PATENT DOCUMENTS

2012/0140848 A1* 6/2012 Lin et al. ............... 375/296
2013/0028068 A1* 1/2013 Park et al. .............. 370/203

FOREIGN PATENT DOCUMENTS

WO WO 2011/126243 A2 * 4/2011

\* cited by examiner

*Primary Examiner* — Chieh M Fan
*Assistant Examiner* — Brian J Stevens
(74) *Attorney, Agent, or Firm* — Ronald O. Neerings; Wade James Brady; Frederick J. Telecky, Jr.

(57) ABSTRACT

A method of wireless data transmission includes a base station having six antennas and at least one user equipment. The base station forms at least one layer of data stream including modulated symbols, precodes the at least one layer of data stream via multiplication with consecutive first and second precoding matrices and transmit the precoded data stream to the at least one user equipment via the six antennas. The first precoding matrix $W_1$ is a block diagonal matrix formed by two identical 3 by Nb matrices, where Nb is the number of distinct Discrete Fourier Transform vectors. The second precoding matrix $W_2$ introduces a phase shift between the two 3 by Nb matrices and selects a column subset from the first precoding matrix.

9 Claims, 4 Drawing Sheets

SIX TRANSMIT ANTENNA CODEBOOK DESIGN

CLAIM OF PRIORITY

This application claims priority under 35 U.S.C. 119(e)(1) to U.S. Provisional Application No. 61/478,599 filed Apr. 25, 2011.

TECHNICAL FIELD OF THE INVENTION

The technical field of this invention is wireless communication such as wireless telephony.

BACKGROUND OF THE INVENTION

The present embodiments relate to wireless communication systems and, more particularly, to the precoding of Physical Downlink Shared Channel (PDSCH) data and dedicated reference signals with codebook-based feedback for multi-input multi-output (MIMO) transmissions.

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Cell-specific Channel State Information Reference Signals (CSI-RS) and Dedicated or Demodulating Reference Signals (DMRS). These reference signals are useful for channel estimation at the receiver. In a multi-input multi-output (MIMO) communication systems with multiple transmit/receive antennas, the data transmission is performed via precoding. Here, precoding refers to a linear (matrix) transformation of a L-stream data into P-stream where L denotes the number of layers (also termed the transmission rank) and P denotes the number of transmit antennas. With the use of dedicated (user-specific) DMRS, a transmitter (base station, also termed eNodeB can perform any precoding operation which is transparent to a user equipment (UE) which acts as a receiver. At the same time, it is beneficial for the base station to obtain a recommendation on the choice of precoding matrix from the user equipment. This is particularly the case for frequency-division duplexing (FDD) where the uplink and downlink channels occupy different parts of the frequency bands, i.e. the uplink and downlink are not reciprocal. Hence, a codebook-based feedback from the UE to the eNodeB is preferred. To enable a codebook-based feedback, a precoding codebook needs to be designed.

To extend cell coverage and service over a wide area, employing remote radio heads (RRHs) is beneficial. Multiple units of RRH are distributed over a wide area and act as multiple distributed antennas for the eNodeB. For downlink transmissions, each RRH unit is associated with a unit of transmit radio device—which constitutes to at least one antenna element along with the associated radio and analog front-end devices. Each unit of RRH is positioned relatively far from the eNodeB and typically connected via a low-latency line such as fiber optic link. Some exemplary configurations are depicted in FIG. 1 where six RRHs are utilized. Depending on whether each RRH is equipped with a single or dual antenna elements, up to 12 antenna elements can be supported.

While the LTE cellular standardization along with its further evolution LTE-Advanced (also known as the E-UTRA and further enhanced E-UTRA, respectively) offer a solid support of codebook-based precoding, the current (Rel.10/11) specification only supports precoding for 2, 4, and 8 antenna elements. From FIG. 2, it is expected that the number of transmit antenna elements changes depending on the number of RRHs. While a downlink transmission with more than 8 antennas may not be necessary, six-antenna transmission is easily envisioned and justified if reasonable flexibility is desired.

While the preceding approaches provide improvements in wireless communications, the present inventors recognize that still further improvements in downlink (DL) spectral efficiency are possible when RRH-based configuration is employed. In particular, a 6-antenna precoding codebook design is invented to improve transmission flexibility. Accordingly, the preferred embodiments described below are directed toward these problems as well as improving upon the prior art. While the preceding approaches provide steady improvements in wireless communications, the present inventors recognize that still further improvements in downlink (DL) spectral efficiency are possible. Accordingly, the preferred embodiments described below are directed toward these problems as well as improving upon the prior art.

SUMMARY OF THE INVENTION

A method of wireless data transmission includes a base station having six antennas and at least one user equipment. The base station forms at least one layer of data stream including modulated symbols, precodes the at least one layer of data stream via multiplication with consecutive first and second precoding matrices and transmit the precoded data stream to the at least one user equipment via the six antennas.

The first precoding matrix $W_1$ is a block diagonal matrix formed by two identical 3 by Nb matrices, where Nb is the number of distinct Discrete Fourier Transform vectors. The set of all the possible first precoding matrices W1 are as follows:

$$B = [b_0 \; b_1 \; \ldots \; b_{11}], \; [B]_{1+m,1+n} = e^{j\frac{2\pi mn}{12}}, \; m = 0, 1, 2 \; n = 0, 1, \ldots, 11.$$

$$X^{(k)} \in \{[b_{(3k)mod12} \; b_{(3k+1)mod12} \; \ldots \; b_{(3k+5)mod12}]: \; k = 0, 1, 2, 3\}$$

$$W_1^{(k)} = \begin{bmatrix} X^{(k)} & 0 \\ 0 & X^{(k)} \end{bmatrix}, \; C_1 = \{W_1^{(0)}, W_1^{(1)}, W_1^{(2)}, W_1^{(3)}\}.$$

The second precoding matrix $W_2$ introduces a phase shift between the two 3 by Nb matrices and selects a column subset from the first precoding matrix. The set of all the possible second precoding matrices $W_2$ are as follows:

$$W_2 \in CB_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\},$$

$$Y \in \{e_1, e_2, \ldots, e_6\}.$$

BRIEF DESCRIPTION OF THE DRAWINGS

These and other aspects of this invention are illustrated in the drawings, in which.

DETAILED DESCRIPTION OF PREFERRED EMBODIMENTS

Figure 1:
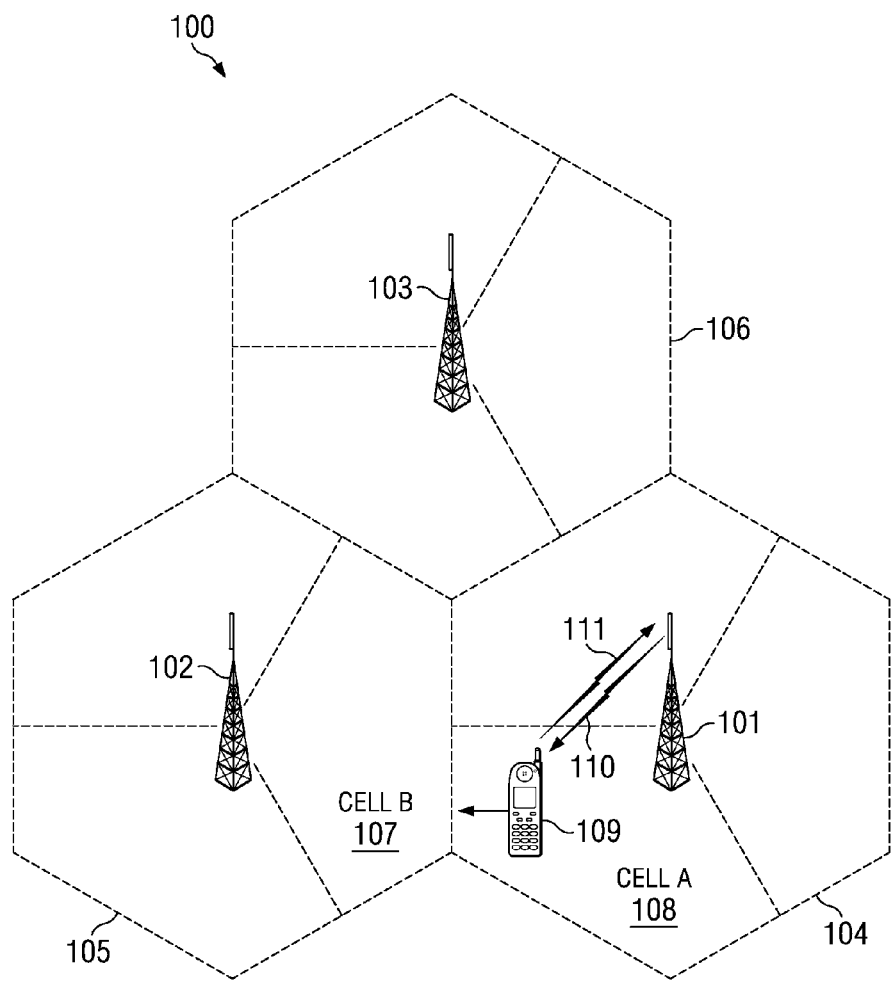
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
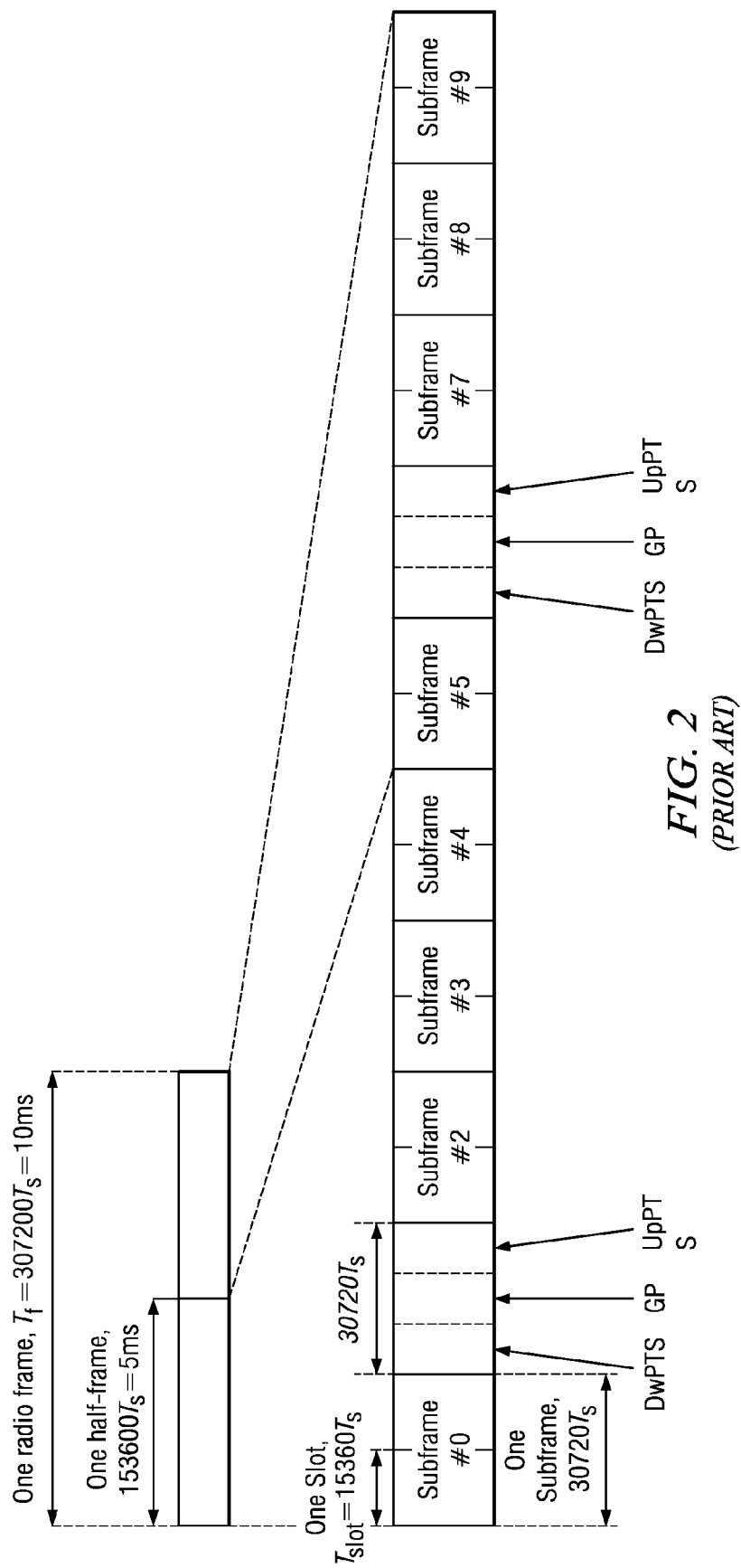
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Config-uration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

A precoding structure that fulfills properties 1 and 2 separates the long-term and short-term components of the precoder. Long-term and short-term refer to the need for feedback interval or time granularity which may be associated with frequency granularity as well. The long-term component does not need high frequency granularity while the short-term component may need higher frequency granularity. A particular structure of interest known as a dual-stage precoder is as follows:

$$W = f(W_1, W_2) \quad (1)$$

where: $W_1$ is the long-term component; and $W_2$ is the short-term component. Each component is assigned a codebook. Thus two distinct codebooks $CB_1$ and $CB_2$ are needed. $W_1$ adapts to the long-term channel statistics such as the spatial covariance matrix. $W_2$ adapts to the short-term channel properties such as phase adjustment needed to counteract short-term fading. For this structure the feedback overhead can be potentially reduced as compared to a one-stage counterpart since $W_1$ does not need to be updated as often as $W_2$. An example of the matrix function $f(.,.)$ includes a product (matrix multiplication) function $f(x,y)=xy$ or the Kronecker product function $f(x,y)=x\otimes y$.

The choice of $W_1$ from a size-N codebook is enumerated by a precoding matrix indicator $PMI_1$. The choice of $W_2$ from a size-M2 codebook is enumerated by a precoding matrix indicator $PMI_2$. Essentially, the final precoding matrix/vector is a function of two PMIs:

$$W = f(PMI_1, PMI_2) \quad (2)$$

Figure 3:
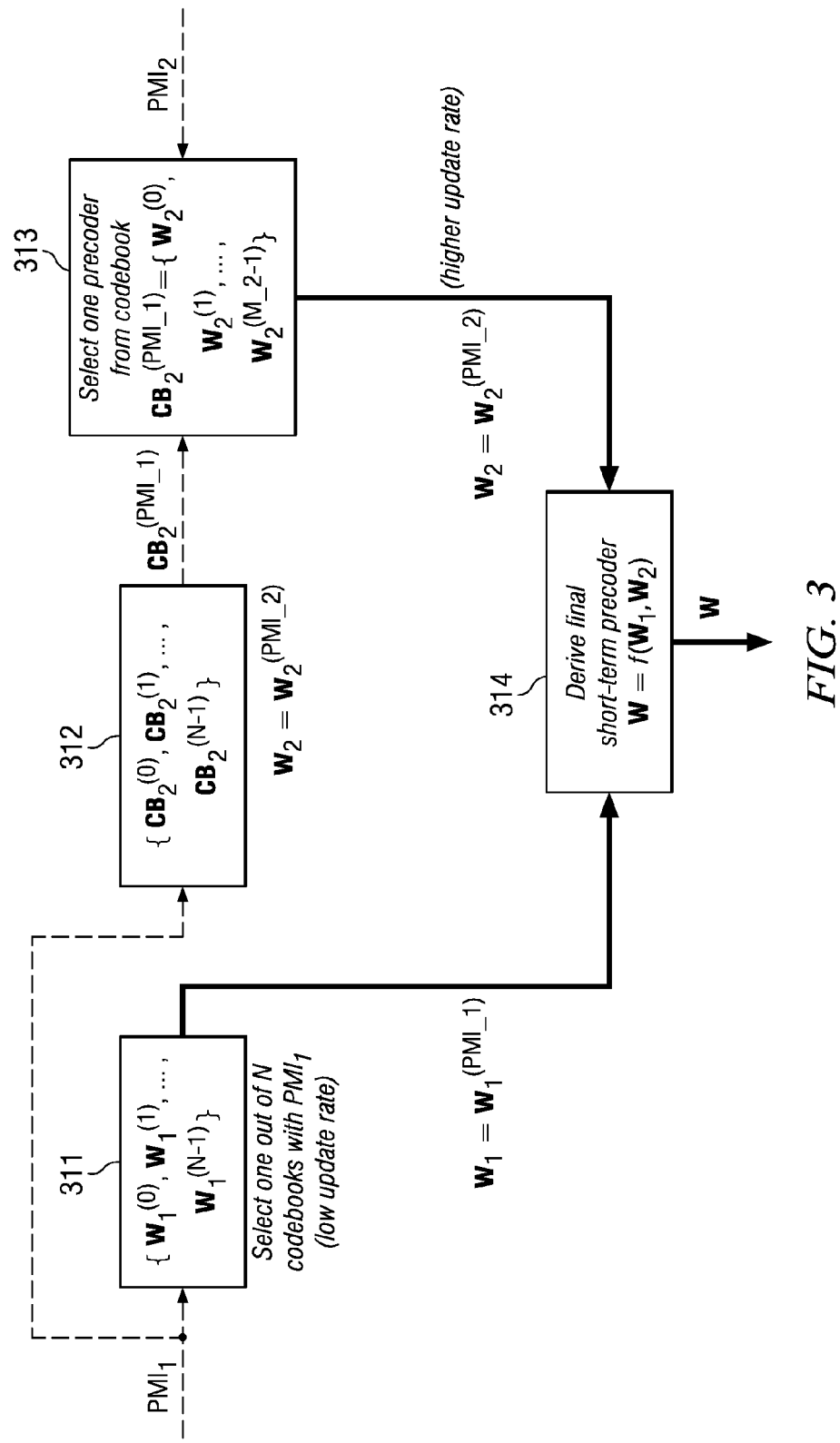
FIG. 3 is a simplified block diagram describing a precoder selection mechanism at the receiver (UE) based on the dual-stage codebook.
Figure 4:
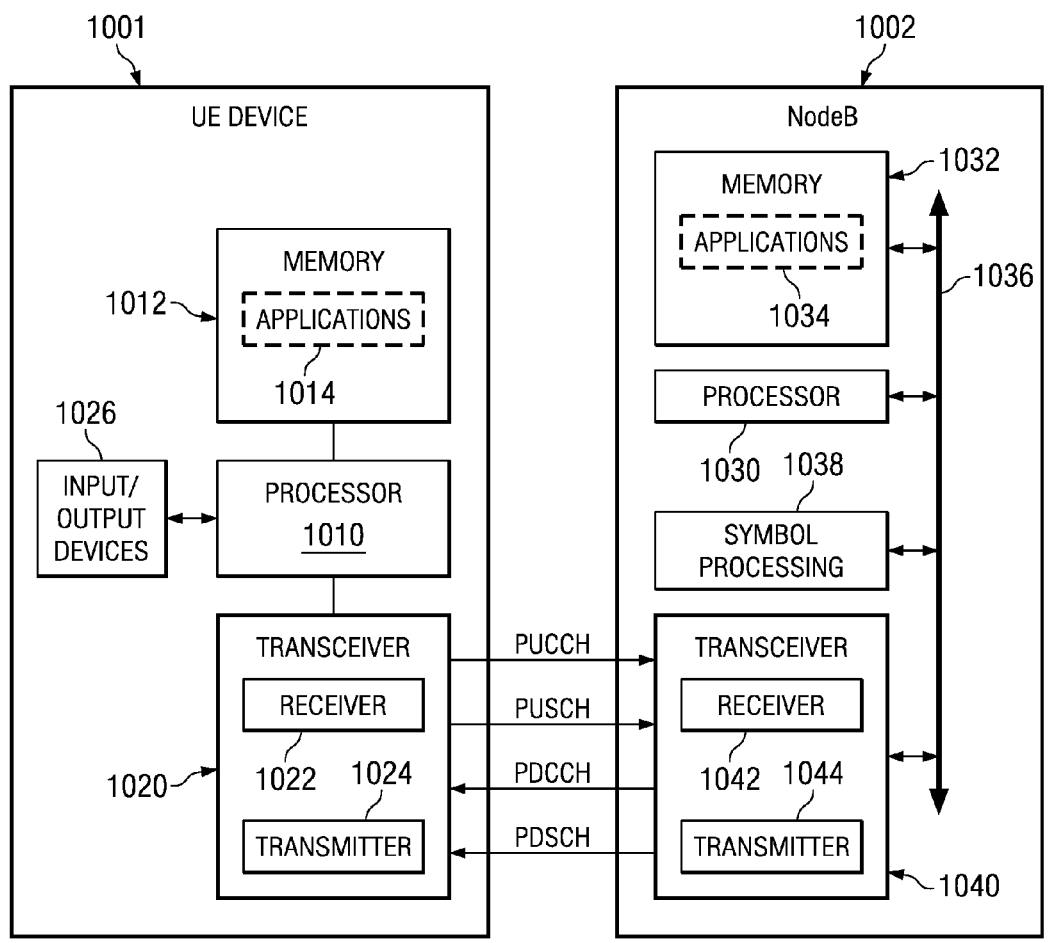
FIG. 4 is a block diagram illustrating internal details of a base station and a mobile user equipment in the network system of FIG. 1 suitable for implementing this invention.

$PMI_1$ is updated in a significantly less frequent rate than $PMI_2$. In addition, $PMI_1$ is intended for the entire system bandwidth while $PMI_2$ can be frequency-selective. FIG. 3 illustrates this overall concept.

FIG. 3 illustrates the technique used in downlink LTE-Advanced (LTE-A). The UE selects $PMI_1$ and $PMI_2$ and hence $W_1$ and $W_2$ in a manner similar to the LTE feedback paradigm.

The UE first selects the first precoder codebook $W_1$ (block 311) based on the long-term channel properties such as spatial covariance matrix such as in a spatial correlation domain from an input of $PMI_1$. This is done in a long-term basis consistent with the fact that spatial covariance matrix needs to be estimated over a long period of time and in a wideband manner.

Conditioned upon $W_1$, the UE selects $W_2$ based on the short-term (instantaneous) channel. This is a two stage process. Block 312 selects one of a set of codebooks $CB_2^{(0)}$ to $CB_2^{(N-1)}$ based upon the $PMI_1$ input. Block 312 selects one predecoder corresponding to the selected codebook $CB_2^{(PMI_1)}$ and $PMI_2$. This selection may be conditioned upon the selected rank indicator (RI). Alternatively, RI can be selected jointly with $W_2$. Block 314 takes the selected $W_1$ and $W_2$ and forms the function $f(W_1, W_2)$.

$PMI_1$ and $PMI_2$ are reported to the base station (eNodeB or eNB) at different rates and/or different frequency resolutions.

For the rest of this application assume the following product matrix precoder:

$$W = f(W_1, W_2) = W_1 W_2 \quad (3)$$

Two alternatives for the block diagonal designs for $W_1$ are given as follows. The first alternative uses a non-overlapping adjacent beam design $W_1$. Note that $C_1$ is used instead of $CB_1$ to represent the codebook for $W_1$. $W_1$ is a block diagonal matrix of X where X is a 3 by Nb matrix and Nb denotes the number of adjacent 3Tx Discrete Fourier Transform (DFT) beams contained in X. This design is able to synthesize N 3Tx DFT beams within each polarization group. For a given N, the spatial oversampling factor is essentially N/3. The overall 3Tx DFT beam collections are captured in the 3 by N matrix B. Using co-phasing in $W_2$ described below, the composite precoder W can synthesize up to N 6Tx DFT beams. In that case, N=12 or 24 is a good candidate. The set of $W_1$ matrices represents (N/Nb) level partitioning (hence non-overlapping) of the N 3Tx beam angles (in X each polarization group). This design results in a codebook size of (N/Nb) for $W_1$.

$$B = [b_0 \; b_1 \; \ldots \; b_{N-1}], [B]_{1+m,1+n} = e^{j\frac{2\pi mn}{N}}, \quad (4)$$
$$m = 0, 1, 2 \; n = 0, 1, \ldots, N-1$$

$$X^{(k)} \in \left\{ [b_{(N_b k) \bmod N} \; b_{(N_b k+1) \bmod N} \; \ldots \; b_{(N_b k + N_b - 1) \bmod N}] : k = 0, 1, \ldots, \frac{N}{N_b} - 1 \right\}$$

$$W_1^{(k)} = \begin{bmatrix} X^{(k)} & 0 \\ 0 & X^{(k)} \end{bmatrix}, C_1 = \left\{ W_1^{(0)}, W_1^{(1)}, W_1^{(2)}, \ldots, W_1^{(N/N_b)-1} \right\}$$

The second alternative uses overlapping adjacent beam design $W_1$.

While the non-overlapping design in first alternative gives a compact design with minimum number of $W_1$ matrices, allowing some overlap in beam angles between two X matrices which represents the beam angles within each polarization group, this may be beneficial to reduce the edge effect. The edge effect refers to the phenomena in frequency-selective precoding where the optimum beam angles for the corner RBs within the sub-band are not covered by the same choice of $W_1$ matrix.

Allowing an overlapping of Nb/2 beam angles between two consecutively-indexed $W_1$ matrices results in the design shown in equation (5). This results in (2N/Nb) $W_1$ matrices. Note this only works for even-valued Nb.

$$B = [b_0 \; b_1 \; \ldots \; b_{N-1}], [B]_{1+m,1+n} = e^{j\frac{2\pi mn}{N}}, \quad (5)$$
$$m = 0, 1, 2 \; n = 0, 1, \ldots, N-1$$

$$X^{(k)} \in \left\{ [b_{(N_b k/2) \bmod N} \; b_{(N_b k/2+1) \bmod N} \; \ldots \; b_{(N_b k/2 + N_b - 1) \bmod N}] : k = 0, 1, \ldots, \frac{2N}{N_b} - 1 \right\}$$

$$W_1^{(k)} = \begin{bmatrix} X^{(k)} & 0 \\ 0 & X^{(k)} \end{bmatrix}, C_1 = \left\{ W_1^{(0)}, W_1^{(1)}, W_1^{(2)}, \ldots, W_1^{(2N/N_b)-1} \right\}$$

Another example allows an overlapping of (Nb−1) beam angles between two consecutively-indexed $W_1$ matrices. This will result in N $W_1$ matrices.

$$B = [b_0 \; b_1 \; \ldots \; b_{N-1}], [B]_{1+m,1+n} = e^{j\frac{2\pi mn}{N}}, \quad (6)$$
$$m = 0, 1, 2 \; n = 0, 1, \ldots, N-1$$

$$X^{(k)} \in \{[b_{(k) \bmod N} \; b_{(k+1) \bmod N} \; \ldots \; b_{(k+N_b-1) \bmod N}] : k = 0, 1, \ldots, N-1\}$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, \ldots, W_1^{N-1}\}$$

For any of these alternatives for $W_1$ design, the same $W_2$ design can be applied for a given value of N and Nb. The following design for $W_2$ can be used.

The first part of $W_2$ utilizes beam selection or beam group selection within each polarization group. The same or different beam(s) can be used for different polarization groups.

The second part of $W_2$ utilizes co-phasing between two different polarization groups. The co-phasing can be done with a unitary vector or matrix assuming a certain alphabet size, such as Quadrature Phase Shift Keying (QPSK) or eight-way Phase Shift Keying (8PSK).

The combination of beam selection and co-phasing in $W_2$ combined with $W_1$ should result in a unitary precoder $W=W_1*W_2$. Assuming beam (group) selection for different polarization groups and QPSK-based co-phasing, the following $W_2$ design can be used for rank-1 and 2 regardless of the value of Nb. For Rank-1:

$$W_2 \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\} \quad (7)$$

For Rank-2:

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\} \quad (8)$$

The Nb by L (with L denoting the rank) matrix Y is composed of selection vectors. Denoting $e_n$ as an Nb×1 selection vector with all zeros except for the n-th element with value 1 (n=1, 2, . . . , Nb), the set of matrix Y (if size Nb) is simply given by equation (9) below.

$$Y \in \{e_1, e_2, \ldots, e_{Nb}\} \quad (9)$$

With the designs given in equations (7), (8) and (9), the size of $W_2$ codebook for rank-1 is 4*Nb and for rank-2 is 2*Nb.

For the rank-1 design, co-phasing with larger alphabet size can be done. Although less preferred, this design can be expressed as follows assuming L-PSK co-phasing:

$$W_2 \in CB_2 = \left\{ \frac{1}{\sqrt{2}} \begin{bmatrix} Y \\ e^{j\frac{2\pi}{L}l} Y \end{bmatrix}, l = 0, 1, \ldots, L-1 \right\} \quad (10)$$

For the rank-2 design it is possible to select two different beam angles instead of one. This design may be beneficial for ULA scenarios. The rank-2 design for $W_2$ can be described in the following (more generic) formulation assuming QPSK-based co-phasing:

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\} \quad (11)$$

Notice that equation (11) is reduced to the previous examples when $Y_1=Y_2=Y$.

If $Y_1$ is not equal to $Y_2$, the vectors $Y_1$ and $Y_2$ should be carefully chosen so that the resulting composite rank-2 precoder is unitary. This may not be possible for all combinations of N and Nb such as Nb<N/2.

For rank-2 each of the final product precoders $W=W_1*W_2$ is a unitary matrix. This essential property needs to be enforced for higher ranks as well.

For higher ranks (3, 4, 5 and 6) the benefit of adaptive channel dependent precoding tends to decrease as rank increases. Thus this invention only provides codebook designs for ranks 3 and 4. Ranks 5 and 6 can use the same $W=W_1*W_2$ construction with $W_1$ and $W_2$ fixed (i.e. size-1 codebook).

For ranks 3 and 4, the adjacent beam designs in equations (4), (5) and (6) can be used as long as it is possible to construct a unitary precoder $W=W_1 * W_2$. A prerequisite for this is it is possible to find two orthogonal column vectors from $W_1$. From the property of the 3Tx DFT matrix, this can be achieved when $N_b=N/2$. Otherwise this condition cannot be fulfilled. Assume $N=12$ and $N_b=6$. Using the overlapping design in equation (6), there are 4 $W_1$ matrices where the 3Tx DFT beam angles (b) in X for the four $W_1$ matrices are: $\{0, 1, 2, 3, 4, 5\}$, $\{3, 4, 5, 6, 7, 8\}$, $\{6, 7, 8, 9, 10, 11\}$, $\{9, 10, 11, 0, 1, 2\}$.

There are only two orthogonal pairs within each of the possible X matrices: 1) the first and fifth columns; and 2) the second and sixth columns. A possible design for $W_2$ codebook for ranks 3 and 4 for this case is:

For Rank-3:

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (12)$$

$(Y_1, Y_2) \in$ $$\left\{ \begin{array}{l} (e_1, [e_1\ e_5]), (e_2, [e_2\ e_6]), (e_5, [e_1\ e_5]), (e_6[e_2\ e_6]), \\ ([e_1\ e_5], e_5), ([e_2\ e_6], e_6), ([e_5\ e_1], e_1), ([e_6\ e_2], e_2), \end{array} \right\}$$

For Rank-4:

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}, \quad (13)$$

$Y \in \{[e_1\ e_5], [e_2\ e_6]\}$

Alternatively, a non-adjacent comb-like $W_1$ design is used for rank-3 and 4. This allows more freedom in selecting a pair of orthogonal columns. For higher ranks, it is expected that frequency-selective subband precoding gain is small. Thus a non-adjacent design has little impact on the overall precoding gain and offers richer scattering. This is compatible with the nature of higher rank transmission. A non-adjacent design can be written as follows:

$$B = [b_0\ b_1\ \ldots\ b_{N-1}], [B]_{1+m,1+n} = e^{j\frac{2\pi mn}{N}}, \quad (14)$$

$$m = 0, 1, 2\ n = 0, 1, \ldots, N-1$$

$$X^{(k)} \in \left\{ \left[ b_{(k)modN}\ b_{\left(k+\frac{N}{N_b}\right)modN}\ \ldots\ b_{\left(k+(N_b-1)\frac{N}{N_b}\right)modN} \right]: k = 0, 1, \ldots, \frac{N}{N_b} - 1 \right\}$$

$$W_1^{(k)} = \begin{bmatrix} X^{(k)} & 0 \\ 0 & X^{(k)} \end{bmatrix}, C_1 = \left\{ W_1^{(0)}, W_1^{(1)}, W_1^{(2)}, \ldots, W_1^{(N/N_b)-1} \right\}$$

For example if $N=12$ and $N_b=3$, there are 4 $W_1$ matrices where each $W_1$ matrix is composed of a comb of beam angles: $\{0, 4, 8\}$, $\{1, 5, 9\}$, $\{2, 6, 10\}$, $\{3, 7, 11\}$. For this case the following design for $W_2$ codebook is applicable:

For Rank-3:

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (15)$$

$(Y_1, Y_2) \in$ $$\left\{ \begin{array}{l} (e_1, [e_1\ e_2]), (e_1, [e_1\ e_3]), (e_2, [e_2\ e_3]), (e_2[e_1\ e_2]), (e_3, [e_1\ e_3]), (e_3[e_2\ e_3]), \\ ([e_1\ e_2], e_1), ([e_1\ e_3], e_1), ([e_2\ e_3], e_2), ([e_1\ e_2], e_2), ([e_1\ e_3], e_3), \{[e_2\ e_3], e_3) \end{array} \right\}$$

For Rank-4:

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}, \quad (16)$$

$Y \in \{[e_1\ e_2], [e_1\ e_3], [e_2\ e_3]\}$

It is possible to construct a multi-rank codebook from a subset of a design. For instance, a multi-rank codebook may be construction using the rank-1 design from any of the examples below, except using the rank-2 design from another example. The same applies to rank-3 and/or rank-4 designs.

Using a subset or the entirety of the above codebook design examples combined with some other designs is also covered by this disclosure.

The following are examples of 6Tx codebook design based on augmenting the Rel. 8 6Tx codebook. While the codebook example covers rank-1 to rank-6 (i.e. multi-rank) format, any multi-rank design constructed from taking at least one rank-specific codebook(s) from one example and some other rank-specific codebook(s) from other example(s) is permitted. A multi-rank codebook may be constructed from a subset of a design. This may include a multi-rank codebook which uses the rank-1 design from any of these examples and uses a rank-2 design from another example. For a given codebook, a combination of a codebook subset of the design for a given rank with some other design(s) is not precluded. The design for ranks 5 and 6 are not given in these examples. Any combination of these examples with any rank-5 and/or rank-6 is not precluded.

In a first example the same $W_1$ based on adjacent overlapping beams is used for all ranks. Assume $N=12$, $N_b=6$ and $W_1$ codebook size-4.

$$B = [b_0\ b_1\ \ldots\ b_{11}], [B]_{1+m,1+n} = e^{j\frac{2\pi mn}{12}}, \quad (17)$$

$$m = 0, 1, 2\ n = 0, 1, \ldots, 11$$

$$X^{(k)} \in \{[b_{(3k)mod12}\ b_{(3k+1)mod12}\ \ldots\ b_{(3k+5)mod12}]: k = 0, 1, 2, 3\}$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, W_1^{(3)}\}$$

For Rank 1, size-24:

$$W_2 \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}, \quad (18)$$

$Y \in \{e_1, e_2, \ldots, e_6\}$

For Rank 2, size-12:

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}, \quad (19)$$

$$Y \in \{e_1, e_2, \ldots, e_6\}$$

For Rank 3, size-16:

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (20)$$

$$(Y_1, Y_2) \in \left\{ \begin{array}{l} (e_1, [e_1\ e_5]), (e_2, [e_2\ e_6]), (e_5, [e_1\ e_5]), (e_6, [e_2\ e_6]), \\ ([e_1\ e_5], e_5), ([e_2\ e_6], e_6), ([e_5\ e_1], e_1), ([e_6\ e_2], e_2), \end{array} \right\}$$

For Rank 4, size-4:

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}, \quad (21)$$

$$Y \in \{[e_1\ e_5], [e_2\ e_6]\}$$

In a second example there are different $W_1$ for different ranks. Assume N=12.

$$B = [b_0\ b_1\ \ldots\ b_{11}], [B]_{1+m, 1+n} = e^{j\frac{2\pi mn}{12}}, \quad (22)$$

$$m = 0, 1, 2\ n = 0, 1, \ldots, 11$$

For Rank 1, $W_1$ codebook size-4, $W_2$ codebook size-12, Nb=3 adjacent non-overlapping:

$$X^{(k)} \in \{[b_{(3k) \bmod 12}\ b_{(3k+1) \bmod 12}\ b_{(3k+2) \bmod 12}] : k = 0, 1, 2, 3\} \quad (23)$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, W_1^{(3)}\}$$

$$W_2 \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}, \quad (24)$$

$$Y \in \{e_1, e_2, e_3\}$$

For Rank 2, $W_1$ codebook size-4, $W_2$ codebook size-6, Nb=3 adjacent non-overlapping:

$$X^{(k)} \in \{[b_{(3k) \bmod 12}\ b_{(3k+1) \bmod 12}\ b_{(3k+2) \bmod 12}] : k = 0, 1, 2, 3\} \quad (25)$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, W_1^{(3)}\}$$

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}, \quad (26)$$

$$Y \in \{e_1, e_2, e_3\}$$

For Rank 3, $W_1$ codebook size-4, $W_2$ codebook size-6 (a subset of all possible 24 $W_2$ matrices is used), Nb=3 non-adjacent/comb:

$$X^{(k)} \in \{[b_k\ b_{k+4}\ b_{k+8}] : k = 0, 1, 2, 3\} \quad (27)$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, W_1^{(3)}\}$$

$$W_2 \in CB_2 = \left\{ \frac{1}{\sqrt{2}} \begin{bmatrix} Y_1 & Y_2 \\ Y_1 & -Y_2 \end{bmatrix} \right\}, \quad (28)$$

$$(Y_1, Y_2) \in \{(e_1, [e_1\ e_2]), (e_1, [e_1\ e_3]),$$
$$(e_2, [e_2\ e_3]), (e_2, [e_1\ e_2]), (e_3, [e_1\ e_3]), (e_3, [e_2\ e_3])\}$$

For Rank 4, $W_1$ codebook size-4, $W_2$ codebook size-6, Nb=3 non-adjacent/comb:

$$X^{(k)} \in \{[b_k\ b_{k+4}\ b_{k+8}] : k = 0, 1, 2, 3\} \quad (29)$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, W_1^{(3)}\}$$

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}, \quad (30)$$

$$Y \in \{[e_1\ e_2], [e_1\ e_3], [e_2\ e_3]\}$$

FIG. 8 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method of wireless data transmission from a base station having six antennas to at least one user equipment, comprising the steps of:
   forming at least one layer of data stream including modulated symbols;
   precoding the at least one layer of data stream via multiplication with consecutive first and second precoding matrices, wherein the first precoding matrix $W_1$ is a block diagonal matrix formed by two identical 3 by Nb matrices, where Nb is the number of distinct Discrete Fourier Transform vectors; and the second precoding matrix $W_2$ introduces a phase shift between the two 3 by Nb matrices and selects a column subset from the first precoding matrix; and
   transmitting the precoded data stream via the six antennas to the at least one user equipment.

2. The method of claim 1, wherein:
   a set of all the possible first precoding matrices W1 are as follows:

$$B = [b_0 \; b_1 \; \ldots \; b_{11}], \; [B]_{1+m,1+n} = e^{j\frac{2\pi mn}{12}},$$

$$m = 0, 1, 2 \; n = 0, 1, \ldots, 11$$

$$X^{(k)} \in \{[b_{(3k)mod12} \; b_{(3k+1)mod12} \; \ldots \; b_{(3k+5)mod12}] : k = 0, 1, 2, 3\}$$

$$W_1^{(k)} = \begin{bmatrix} X^{(k)} & 0 \\ 0 & X^{(k)} \end{bmatrix}, \; C_1 = \{W_1^{(0)}, W_1^{(1)}, W_1^{(2)}, W_1^{(3)}\}$$

where: B is a 3 by N matrix; X is a 3 by Nb matrix; and m, n and k are index variables.

3. The method of claim 1, wherein:
   a set of all the possible second precoding matrices $W_2$ are as follows:

$$W_2 \in CB_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\},$$

$$Y \in \{e_1, e_2, \ldots, e_6\}$$

where: $CB_2$ is a codebook for the second precoding matrices $W_2$; and $e_n$ is an Nb by 1 selection vector with all zeros except for the n-th element with value 1 (n=1, 2, . . . , Nb).

4. A wireless data transmission system comprising:
   a base station having six antennas operable to:
      form at least one layer of data stream including modulated symbols;
      precode the at least one layer of data stream via multiplication with consecutive first and second precoding matrices:
         wherein the first precoding matrix $W_1$ is a block diagonal matrix formed by two identical 3 by Nb matrices, where Nb is the number of distinct Discrete Fourier Transform vectors, and the second precoding matrix $W_2$ introduces a phase shift between the two 3 by Nb matrices and selects a column subset from the first precoding matrix; and transmit the precoded data stream via six antennas; and at least one user equipment operable to receive the transmitted precoded data streams.

5. The wireless data transmission system of claim 4, wherein:

said base station is further operable to precode the at least one layer of data stream wherein a set of all the possible first precoding matrices W1 are as follows:

$$B = [b_0 \; b_1 \; \ldots \; b_{11}], [B]_{1+m,1+n} = e^{j\frac{2\pi mn}{12}},$$
$$m = 0, 1, 2 \; n = 0, 1, \ldots, 11$$
$$X^{(k)} \in \{[b_{(3k)mod12} \; b_{(3k+1)mod12} \; \ldots \; b_{(3k+5)mod12}] : k = 0, 1, 2, 3\}$$
$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, W_1^{(3)}\}$$

where: B is a 3 by N matrix; X is a 3 by Nb matrix; Nb denotes the number of adjacent transmit antenna Discrete Fourier Transform (DFT) beams; and m, n and k are index variables.

6. The wireless data transmission system of claim 4, wherein:

said base station is further operable to precode the at least one layer of data stream wherein a set of all the possible second precoding matrices $W_2$ are as follows:

$$W_2 \in CB_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\},$$
$$Y \in \{e_1, e_2, \ldots, e_6\}$$

where: $CB_2$ is a codebook for the second precoding matrices $W_2$; $e_n$ is an Nb by 1 selection vector with all zeros except for the n-th element with value 1 (n=1, 2, Nb); and Nb denotes the number of adjacent transmit antenna Discrete Fourier Transform (DFT) beams.

7. A wireless data transmission system comprising:

a base station having six antennas operable to:

form at least one layer of data stream including modulated symbols;

precode the at least one layer of data stream via multiplication with consecutive first and second precoding wherein:

the first precoding matrix $W_1$ is a block diagonal matrix formed by two identical 3 by Nb matrices, where Nb is the number of distinct Discrete Fourier Transform vectors, and the second precoding matrix $W_2$ introduces a phase shift between the two 3 by Nb matrices and selects a column subset from the first precoding matrix; and transmit the precoded data stream via six antennas.

8. The wireless data transmission system of claim 7, wherein:

said base station is further operable to precode the at least one layer of data stream wherein a set of all the possible first precoding matrices W1 are as follows:

$$B = [b_0 \; b_1 \; \ldots \; b_{11}], [B]_{1+m,1+n} = e^{j\frac{2\pi mn}{12}},$$
$$m = 0, 1, 2 \; n = 0, 1, \ldots, 11$$
$$X^{(k)} \in \{[b_{(3k)mod12} \; b_{(3k+1)mod12} \; \ldots \; b_{(3k+5)mod12}] : k = 0, 1, 2, 3\}$$
$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, W_1^{(3)}\}$$

where: B is a 3 by N matrix; X is a 3 by Nb matrix; Nb denotes the number of adjacent transmit antenna Discrete Fourier Transform (DFT) beams; and m, n and k are index variables.

9. The wireless data transmission system of claim 7, wherein:

said base station is further operable to precode the at least one layer of data stream wherein a set of all the possible second precoding matrices $W_2$ are as follows:

$$W_2 \in CB_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\},$$
$$Y \in \{e_1, e_2, \ldots, e_6\}$$

where: $CB_2$ is a codebook for the second precoding matrices $W_2$; $e_n$ is an Nb by 1 selection vector with all zeros except for the n-th element with value 1 (n=1, 2, . . . , Nb); and Nb denotes the number of adjacent transmit antenna Discrete Fourier Transform (DFT) beams.

\* \* \* \* \*